US012170159B1

(12) United States Patent
Cohen

(10) Patent No.: US 12,170,159 B1
(45) **Date of Patent: *Dec. 17, 2024**

(54) CABLES

(71) Applicant: Morris E. Cohen, Brooklyn, NY (US)

(72) Inventor: Morris E. Cohen, Brooklyn, NY (US)

(73) Assignee: Morris E. Cohen, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,237

(22) Filed: Mar. 1, 2023

Related U.S. Application Data

(63) Continuation of application No. 16/871,025, filed on May 10, 2020, now Pat. No. 11,600,407.

(60) Provisional application No. 62/846,092, filed on May 10, 2019.

(51) Int. Cl.
*H01B 7/40* (2006.01)
*H04R 1/10* (2006.01)

(52) U.S. Cl.
CPC ............. *H01B 7/40* (2013.01); *H04R 1/1033* (2013.01)

(58) Field of Classification Search
CPC . H01B 7/02; H01B 7/04; H01B 7/292; H01B 7/40; H01B 11/02; H01B 11/06; H01B 7/00
USPC ........... 174/36, 110 R, 112, 113 R, 115, 116, 174/117 R, 117 F, 117 FF, DIG. 11
See application file for complete search history.

(56) References Cited

U.S. PATENT DOCUMENTS

| | | | | |
|---|---|---|---|---|
| 2,585,054 A * | 2/1952 | Stachura | H02G 3/0481 | 174/DIG. 11 |
| 3,005,282 A | 10/1961 | Christiansen | | |
| 5,906,507 A * | 5/1999 | Howard | H02G 11/006 | D13/153 |
| 5,949,026 A * | 9/1999 | DeFlorio | H01B 7/0807 | 174/117 R |
| 6,909,050 B1 * | 6/2005 | Bradford | H01B 7/40 | 174/111 |
| 7,507,908 B1 * | 3/2009 | Wu | H01B 7/06 | 174/115 |
| 8,269,110 B2 * | 9/2012 | Scifo | H04M 1/15 | 174/135 |
| 8,447,062 B2 * | 5/2013 | Lin | H04R 1/10 | 381/384 |
| 8,455,758 B2 * | 6/2013 | Groset | H04R 5/033 | 174/DIG. 11 |
| 8,567,149 B2 | 10/2013 | Kuzmin | | |
| 8,975,514 B2 * | 3/2015 | Groset | B29C 45/0055 | 174/DIG. 11 |
| 9,892,822 B2 * | 2/2018 | Liu | H01R 24/60 | |
| 10,141,729 B2 | 11/2018 | Schaefer | | |
| 2008/0099229 A1 * | 5/2008 | Scifo | H04M 1/15 | 174/117 R |

* cited by examiner

*Primary Examiner* — William H. Mayo, III
(74) *Attorney, Agent, or Firm* — Goldberg Cohen LLP

(57) ABSTRACT

Cables, including electrical cables. The cables are provided with a series of elements designed to interlock with each other when a first length of cable is pressed against a second length of cable, the element including protrusions and spaces between the protrusions. A user folds a length of cable on itself or on another cable, snugly pressing the protrusions into the spaces, to store the cable, or to restrict the movement of the cable during use. In this manner, movement of the cable is restricted into the configuration set by the user, and preventing the cable from becoming tangled, knotted, or so forth.

8 Claims, 2 Drawing Sheets

CABLES

RELATED APPLICATIONS

This application claims the priority of U.S. Nonprovisional application Ser. No. 16/871,025 filed May 10, 2020, which claims the priority of U.S. Provisional Application Ser. No. 62/846,092 filed May 10, 2019, all of which are fully incorporated herein by reference.

FIELD OF THE INVENTION

The present invention relates to cables of all forms, and particularly to improved electrical cables.

BACKGROUND OF THE INVENTION

Currently, wires, cords, or cables are well known in a variety of arts. For example, electrical wires or cables are used to connect computers, their accessories, phones, and many other types of items to power sources. They are used to connect components to each other, or components to other objects, whether to parts of the body (such as headphones to one's ears), or otherwise. They are used in consumer applications, household applications, clothing applications (such as shoes), automotive applications, and many other applications, for a myriad of uses.

It is common, however, for cables to become tangled or knotted, whether with each other, or with other objects (such as other cables). Accordingly, there is a need in the art for improved cables which are less prone to tangling or knotting.

SUMMARY OF THE INVENTION

In accordance with the inventions, improved cable structures are provided. The structures assist in: avoiding the tangling and knotting of cables which is currently common in the art; in the folding and unfolding of cables; and in storing cables in a desired configuration.

DETAILED DESCRIPTION OF THE INVENTION AND THE PREFERRED EMBODIMENTS

In preferred embodiments of the invention, wires, cords, or cables are provided (collectively, "cables" hereafter). The cables of the invention are provided with a series of elements designed to interlock with each other when a first length of cable is pressed against a second length of cable.

For example, one preferred set of interlocking elements are structured the same or similar to any of the structures used in the popular building blocks known as Legos®. One example (which is not meant to be exclusive) of such structures is shown in U.S. Pat. No. 3,005,282. Alternatively, other structures for interlocking elements can be provided.

For example, any of the interlocking structures shown in U.S. Pat. No. 8,567,149 issued to Kuzmin can be used. Or, any other interlocking structure suitable for the needs of the invention can be utilized.

Figure 1:
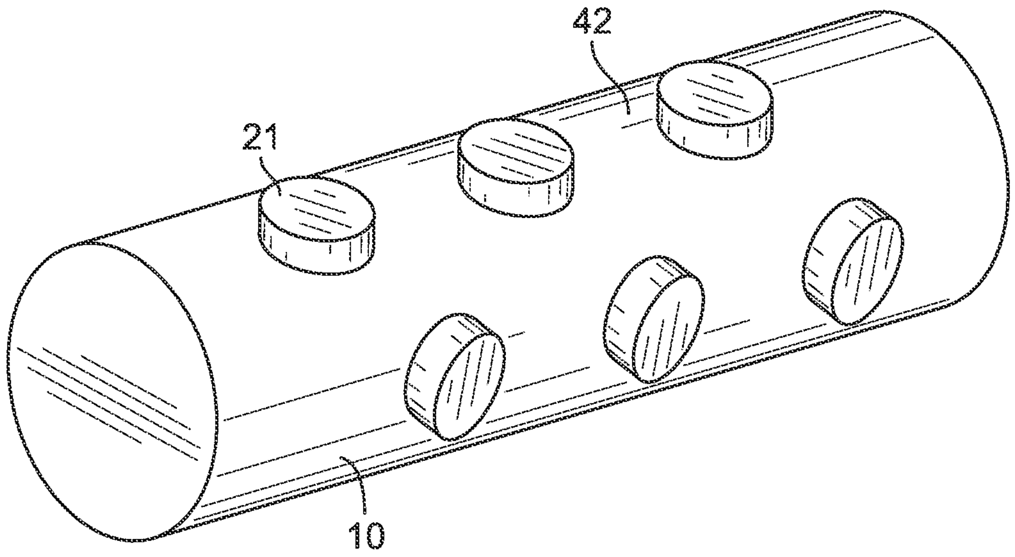
FIG. 1 is a perspective view of an improved cable in accordance with an embodiment of the present inventions.

As shown in FIG. 1, for example, in one preferred embodiment, cable 10 includes a surface having protrusions 21. Protrusions 21 have spaces 42 or indentations between them such that the protrusions 21 can fit snugly into spaces 42, and can be easily pulled out of spaces 42. Thus, the protrusions can be secured within, and are reversibly removable from, the spaces.

In accordance with a preferred embodiment, a user folds a length of cable on itself, pressing the protrusions into the spaces to store the cable, or to restrict the movement of the cable. In a particular, movement of the cable is restricted into the configuration set by the user, and preventing the cable from becoming tangled, knotted, or so forth. The user can likewise press the protrusions of one cable into the spaces of another cable for the same benefits.

As a further example, a user can roll a length of cable into a coil, pressing the protrusions 21 into the spaces 42, thereby fixing the cable into that coil shape. Without the invention, the cable can move around thereby becoming tangled and knotted over time. However, with the invention, the cable is attached to itself and fixed in place in a desired configuration, preventing tangling or knotting.

While the cable of the invention is preferably flexible along its entire length, that is not a requirement of the invention. For example, some cables may provided with flexible segments and rigid segments (e.g. with a joint between the rigid and flexible segment).

Similarly, in some embodiments, the protrusions are rigid; while in others they are flexible. In other embodiments they are semi-rigid or semi-flexible, whether in whole or in part. The protrusions can be made of rubber, plastic, or any other desired material suitable for the purposes of the invention.

Furthermore, the protrusions and indentations can be provided along the entire length of the cable or just segments thereof.

In a preferred embodiment, the first and second lengths of cable can be part of the same cable.

In an additional or alternative embodiment, the first and second lengths of cable are parts of different cables, with the protrusions of one cable being designed to fit into the spaces of the same cable and/or the other cable.

In an additional or alternative embodiment, the protrusions on a cable are designed to fit into spaces or indentations on any other surface or object. For example, the protrusions on a cable can be designed to fit into spaces or indentations on a power supply, allowing a user to secure the cable to the power supply.

In further embodiments, the protrusions on the cables are cylindrical, or substantially cylindrical.

In further embodiments, the protrusions on the cables have a cross-section of uniform, or approximately uniform, diameter.

In further embodiments, the protrusions on the cables have a cross-section wherein the top of the protrusion has a diameter which is substantially equal to, or is less than, the diameter of the base of the protrusion.

If desired, the top of the protrusions can be entirely flat. Alternatively, in a preferred embodiment, the top of the protrusion is substantially flat, with the edge of the top of the protrusions be rounded, to facilitate fitting the protrusions into the spaces. Further alternatively, the entire top of the protrusions can be rounded.

In one embodiment the protrusions are solid. In a alternative embodiment, the protrusions are hollow.

Figure 2:
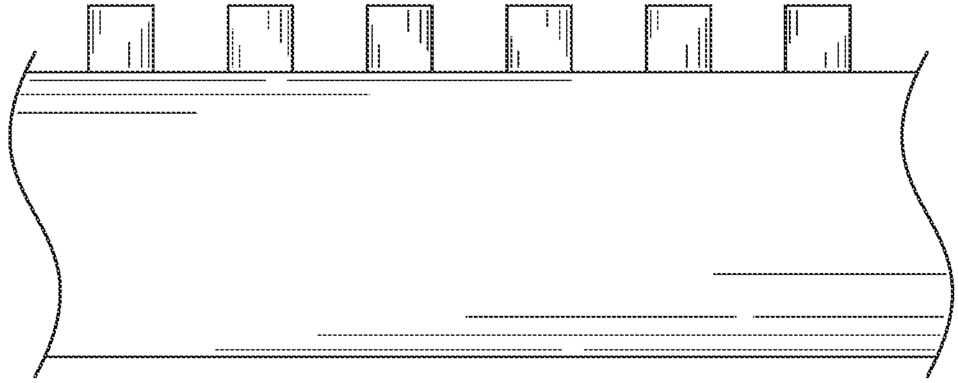
FIG. 2 is a plan view of an improved cable in accordance with an embodiment of the present inventions.
Figure 3:
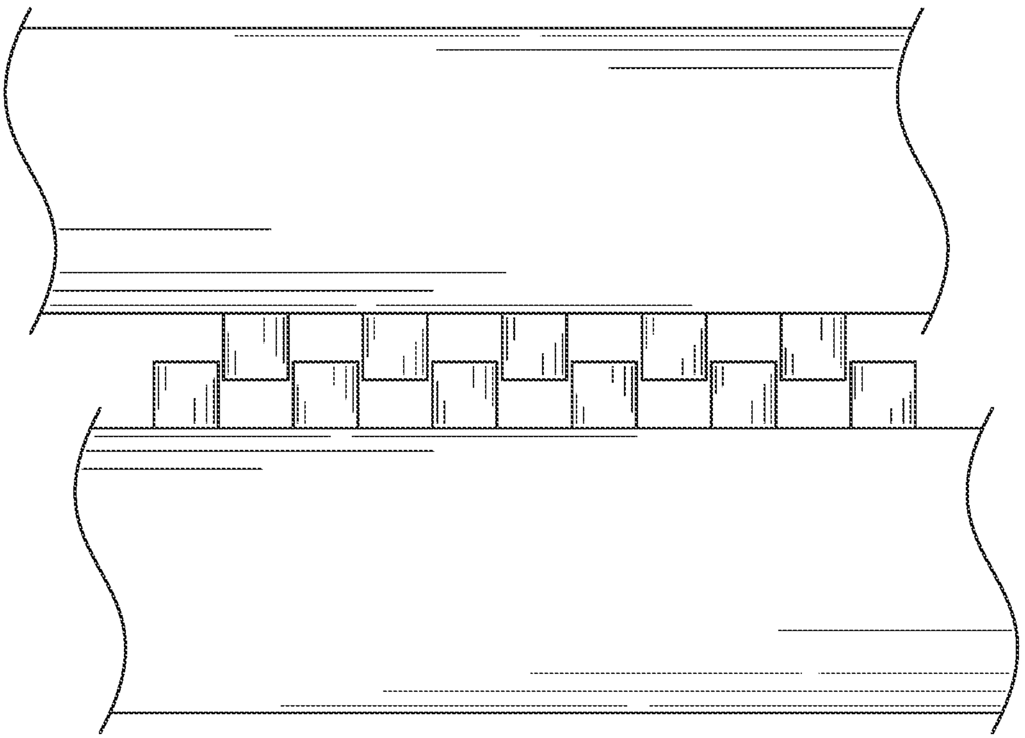
FIG. 3 is a plan view of improved cables in accordance with an embodiment of the present inventions, showing a segment of cable fitting into a segment of the same or another cable.

In one embodiment, the protrusions project from the cable, as shown in FIG. 2, and form indentations in the spaces between protrusions, such that the protrusions fits into those spaces or indentations, as shown in FIG. 3.

In an alternative or additional embodiment, the protrusions are on one area or segment of cable and the indentations are on a second, separate, area or segment of cable. In such embodiment, the areas of protrusions are the same as, similar to, or analogous to, the tops of Lego® building block products, and the areas of indentations are the same as, similar to, or analogous to the bottoms of Lego® building block products. The second area can be the other side from the side of the cable having the protrusions, and/or can be provided at a desired distance along the cable away from the first area, or so forth.

In a further embodiment, the cables include segments of protrusions, and segments of spaces or indentations, and the protrusions on one segment fits into the spaces or indentations on another segment of the same cable, or another cable or object.

In further embodiments, the cables can be made of fabric (e.g. with rubberized protrusions), and be joined together to make clothing, accessories, knapsacks, handbags, shoe laces, or any other material.

In further embodiments, the cables and protrusions can be made of any other materials desired, for any other form of fabrication project or purpose.

The invention can be used with any type of cables, whether electrical cables (including, but not limited to, power cables of any type, computer cables of any type, phone or smartphone cables of any type, headphone cables, or any other types of electrical or electronic cables), any cables for conveying information, whether fiber optic cables or so forth, non-electrical cables of any type, ropes of any type, and so forth.

Having described the invention with respect to particular embodiments, it is to be understood that the description is not meant as a limitation, since numerous other modifications and variations may be made to the inventions or may suggest themselves. It is intended that the present invention and application cover all such modifications and variations. Moreover, the information in each paragraph relates to and is intended to be used in conjunction with the inventions as disclosed in all other paragraphs herein and in conjunction with the information presented in the related applications.

I claim:

1. An article of manufacture, comprising:

(a) an electric cable;

(b) said cable comprising protrusions;

(c) said cable comprising indentations;

(d) wherein said cable does not use a sliding element for securing together portions of said cable;

(e) and wherein said protrusions and indentations are not part of hook or loop fastening materials;

(f) said protrusions each comprising a top, said top comprising a cross-section;

(g) said protrusions each comprising a base, said base comprising a cross-section;

(h) said cross-section of said top having a diameter which is substantially equal to the diameter of said cross-section of said base, or which is less than the diameter of said cross-section of said base;

(i) wherein said cable sequentially comprises a first segment, a second segment, and a third segment, such that first segment is followed by said second segment, and such that said second segment is followed by said third segment, with said second segment being located between said first segment and said third segment;

(j) wherein said cable can be folded to press some of said protrusions into said indentations, such that said protrusions fit snugly into, and are reversibly removable from, said indentations, such that the user has the option to:

(1) secure said first segment to at least a portion of said second segment;

(2) or secure said first segment to at least a portion of said third segment;

(3) or secure said first segment both to least a portion of said second segment and at least a portion of said third segment;

(k) and wherein said cable is a cable for conveying information.

2. An article of manufacture as claimed in claim 1, wherein said cable is a computer cable.

3. An article of manufacture as claimed in claim 1, wherein said cable is a smartphone cable.

4. An article of manufacture as claimed in claim 1, wherein said cable further comprises a power cable.

5. An article of manufacture as claimed in claim 4, wherein said cable is a computer cable.

6. An article of manufacture as claimed in claim 4, wherein said cable is a smartphone cable.

7. An article of manufacture as claimed in claim 1, wherein said protrusions are cylindrical.

8. An article of manufacture as claimed in claim 1, wherein said protrusions comprise uniform diameter.

* * * * *